United States Patent
Ito

(10) Patent No.: US 6,519,524 B2
(45) Date of Patent: Feb. 11, 2003

(54) APPARATUS AND METHOD FOR MONITORING START OF ENGINE

(75) Inventor: Tokiji Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 127 days.

(21) Appl. No.: 09/837,199

(22) Filed: Apr. 19, 2001

(65) Prior Publication Data

US 2002/0022922 A1 Feb. 21, 2002

(30) Foreign Application Priority Data

Apr. 28, 2000 (JP) ........................... 2000-129255

(51) Int. Cl.$^7$ ................. G01M 15/00; F02N 11/08; F02B 77/08
(52) U.S. Cl. ........................... 701/113; 701/114
(58) Field of Search .................. 123/179.3, 179.4, 123/519, 520; 701/112–114

(56) References Cited

U.S. PATENT DOCUMENTS 4,466,392 A * 8/1984 Uchida et al. ............ 123/179.4
4,485,772 A * 12/1984 Uchida et al. ............ 123/179.4

FOREIGN PATENT DOCUMENTS

JP          06-066212 A      3/1994

* cited by examiner

Primary Examiner—Gene Mancene
Assistant Examiner—Arnold Castro
(74) Attorney, Agent, or Firm—Oliff & Berridge, PLC

(57) ABSTRACT

An engine performs automatic intermittent operation with an ignition switch on. If the speed of the engine reaches a predetermined level when the ignition switch is on, a start flag, which indicates that the engine has started, is set to on. The start flag is maintained on even if the engine is stopped due to automatic intermittent operation until the ignition switch is turned off. That is, the engine is assumed to be running even if the engine is stopped due to automatic intermittent operation. Therefore, various control procedures are not suspended due to automatic intermittent operation of the engine.

17 Claims, 4 Drawing Sheets

APPARATUS AND METHOD FOR MONITORING START OF ENGINE

BACKGROUND OF THE INVENTION

The present invention relates to an apparatus and a method for monitoring the start of an engine that performs automatic intermittent operation.

A malfunction testing apparatus that detects a malfunction of an engine system only when the running state of the engine satisfies a predetermined condition is known in the art.

One of such apparatuses is a malfunction testing apparatus for a fuel vapor treating system. This testing apparatus detects whether there is a puncture in a vapor passage. The testing is performed in the following manner.

First, the pressure in the vapor passage is lowered below the atmospheric pressure and the passage is then sealed. The rate of pressure increase in the passage is monitored.

If the rate of pressure increase is equal to or greater than a predetermined level, the apparatus determines that there is a malfunction, or a puncture. If the rate of pressure increase is less than the predetermined level, the apparatus judges that there is no malfunction. The judgment is based on the fact that the pressure in the vapor passage increases relatively quickly if atmospheric air flows into the passage through a puncture.

However, when the temperature of fuel is relatively high, the amount of vaporized fuel is increased in the vapor passage, which increases the pressure in the passage. If the malfunction test is performed when the amount of vaporized fuel is relatively great, the apparatus is likely to falsely detect a malfunction. Thus, the apparatus performs the test only if the coolant temperature when the engine is started is relatively low. That is, the apparatus performs the test when determining that the fuel temperature is relatively low and thus there is not much fuel vaporization. Accordingly, there will be less false detections of a malfunction.

In the prior art, whether an engine has started is detected by monitoring the engine speed. That is, the engine is judged to have started when the engine speed reaches a predetermined level. The above test is also performed if the coolant temperature is equal to or lower than a predetermined level when the engine speed is judged to have reached a predetermined level.

Hybrid engine systems and economic running engine systems perform automatic intermittent operation. Judging a start of such engine systems based on the engine speed and the coolant temperature is accompanied by the following disadvantages.

In the intermittent operation, an engine is intermittently stopped and started. When the engine is started after a temporal pause, whether the malfunction test should be performed is determined based on the coolant temperature. As a result, not only the malfunction test is suspended every time the intermittent operation is performed, but also, since the intermittent operation raises the coolant temperature, the condition of the malfunction test is less frequently satisfied, which limits the number of the performance of the test.

Such disadvantages can occur not only during the malfunction test but also during other control procedures that are performed when the engine is being cranked.

BRIEF SUMMARY OF THE INVENTION

Accordingly, it is an objective of the present invention to provide a start monitoring apparatus and a method that prevent control procedures from being suspended by automatic intermittent operations of an engine.

To achieve the foregoing and other objectives and in accordance with the purpose of the present invention, an apparatus for monitoring start of an engine is provided. The engine performs automatic intermittent operation with electricity being supplied to an engine system. The apparatus includes a controller for judging that the engine is started with electricity being supplied to the engine system. After judging that the engine has started, the controller assumes that the engine is running even if the engine is stopped due to automatic intermittent operation until the supply of electricity to the engine system is stopped.

The present invention also provides a method for monitoring start of an engine. The engine performs automatic intermittent operation with electricity being supplied to an engine system. The method includes judging that the engine is started with electricity being supplied to the engine system, and assuming that the engine is running even if the engine is stopped due to automatic intermittent operation once the engine is judged to be started until the supply of electricity to the engine system is stopped.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWING

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
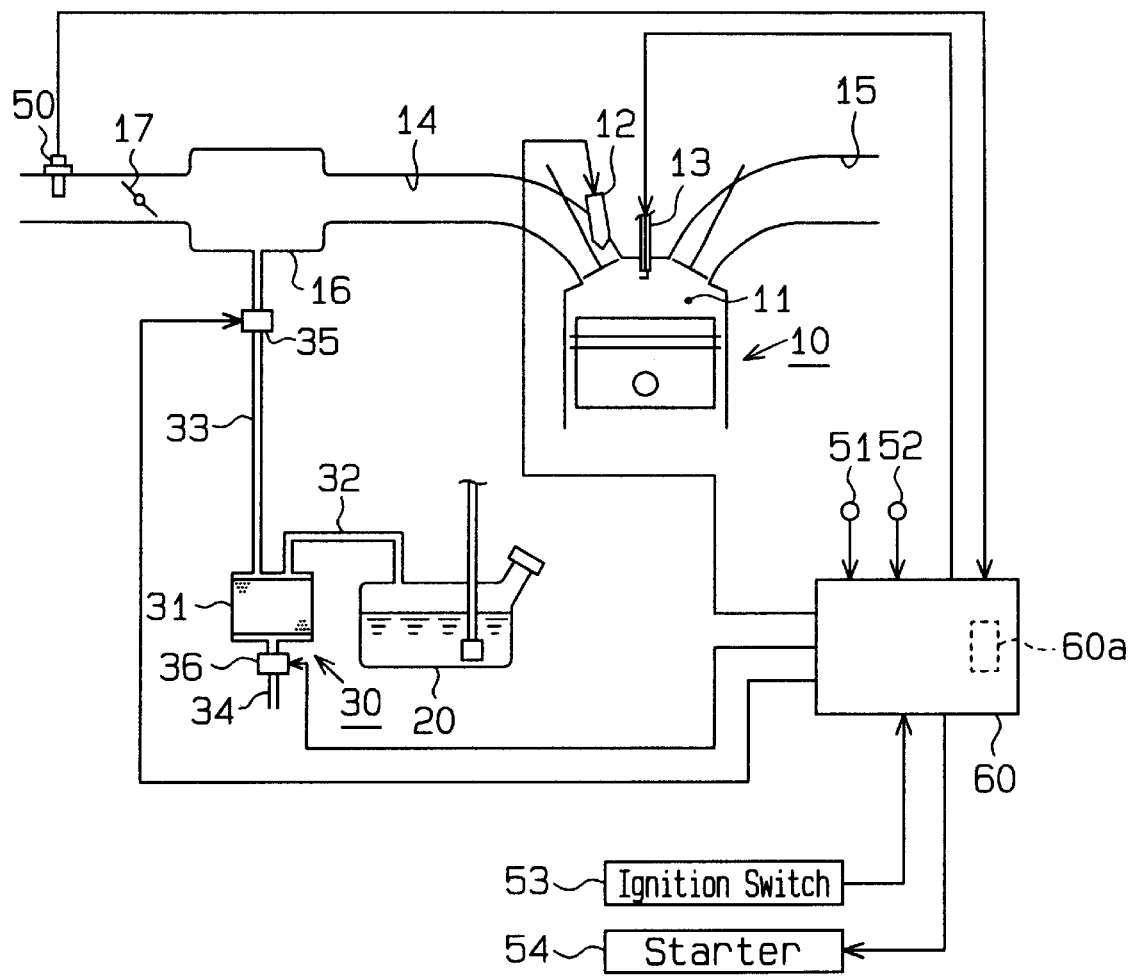
FIG. 1 is a schematic view showing an engine system and a start monitor apparatus according to the present invention.
Figure 2:
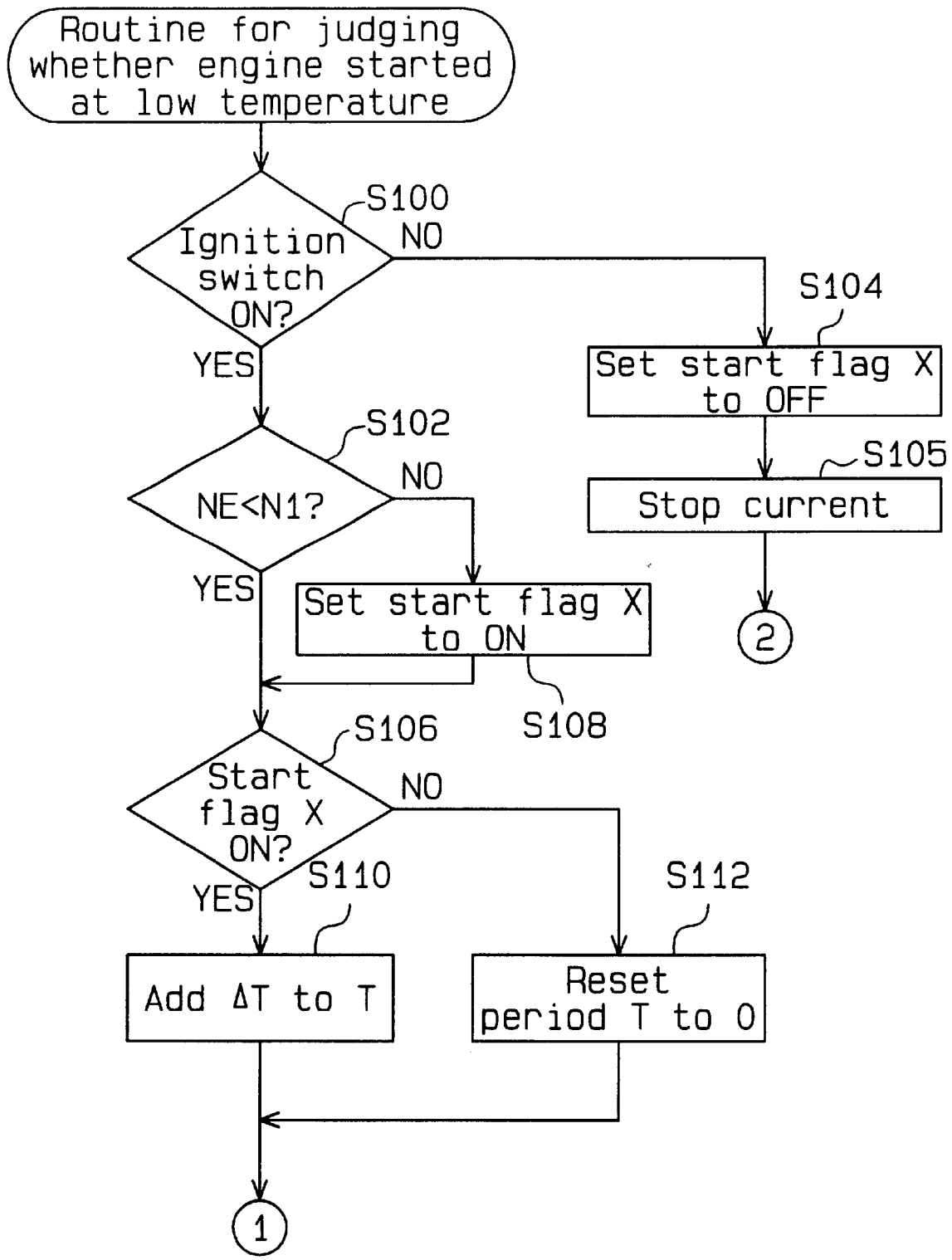
FIG. 2 is a flowchart showing a routine for detecting that the engine of FIG. 1 has started at a low temperature.
Figure 3:
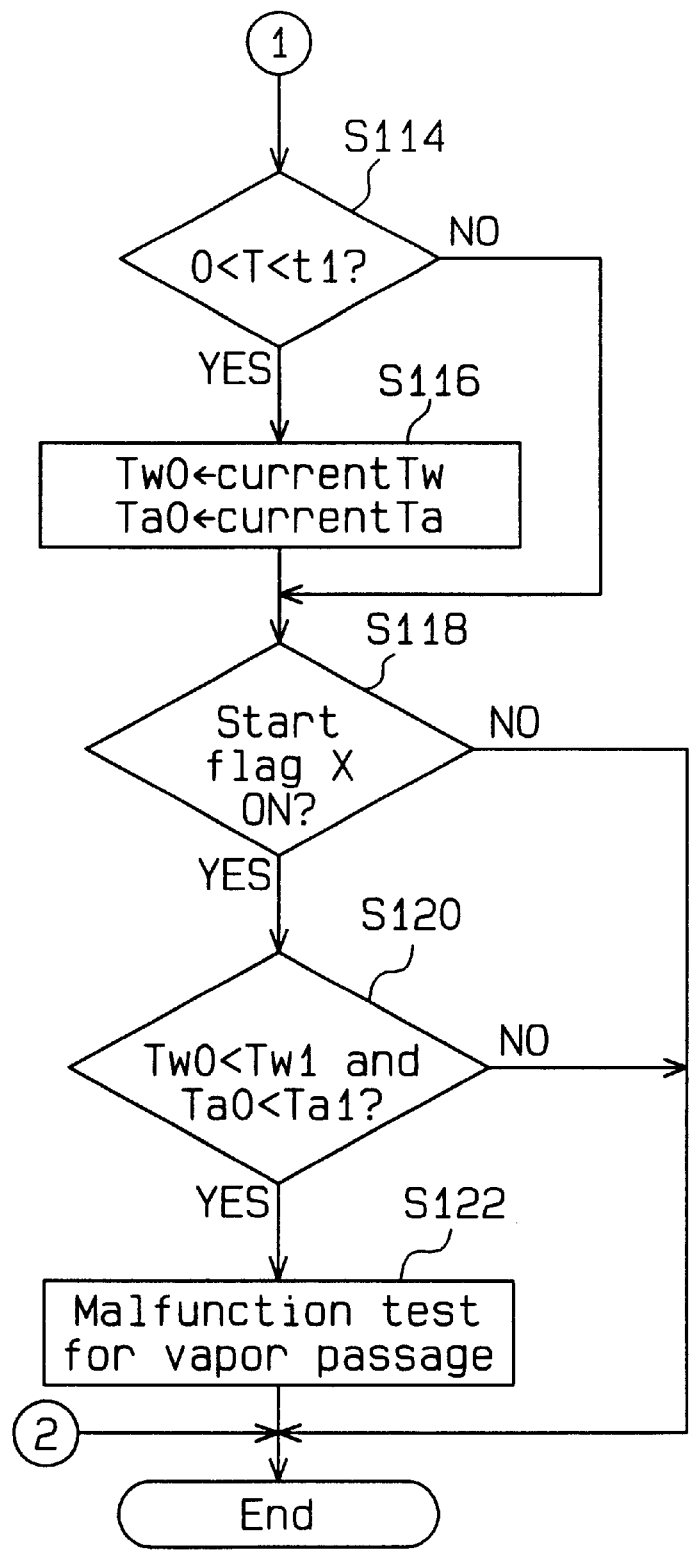
FIG. 3 is a flowchart showing the remainder of the routine of FIG. 2.

One embodiment of the present invention will now be described with reference to FIGS. 1 to 4. FIG. 1 schematically illustrates a start monitoring apparatus and an engine system. The engine system includes an engine 10, a fuel tank 20 and a fuel vapor treating mechanism 30.

The engine 10 includes a fuel injector 12 and a spark plug 13. The fuel injector 12 receives fuel from the fuel tank 20 through a fuel supply passage (not shown) and injects the fuel into a combustion chamber 11. The spark plug 13 ignites the mixture of the injected fuel and intake air. An intake air passage 14 and an exhaust gas passage 15 are connected to the combustion chamber 11. A surge tank 16 is provided in the intake air passage 14, and a throttle valve 17 for adjusting the amount of intake air is provided upstream of the surge tank 16. The engine system also includes an intake air temperature sensor 50, a coolant temperature sensor 51 and an engine speed sensor 10. The intake air temperature sensor 50 is located in the intake air passage 14 and detects the temperature of intake air. The coolant temperature sensor 51 detects the temperature of engine coolant. The engine speed sensor 10 detects the speed of the engine 10. Detected signals of the sensors 50–52 are sent to a controller, which is an electronic control unit (ECU) 60 in this embodiment. The ECU 60 controls the whole engine system.

The fuel vapor treating mechanism 30 includes a canister 31, a purge passage 33, an atmospheric air introduction passage 34 a purge control valve and a block valve 36. The canister 31 is connected to the fuel tank 20 through a vapor passage 32. The purge passage 33 connects the canister 31 to the surge tank 16. The atmospheric air introduction passage 34 introduces the atmospheric air into the canister 31. A purge control valve 35 opens and closes the purge passage 33.

Fuel vapor produced in the fuel tank 20 is introduced into the canister 31 from the fuel tank 20 through the vapor passage 32 and is temporarily adsorbed by an adsorbent provided inside the canister 31. When the purge control valve 35 and the block valve 36 are opened, atmospheric air is introduced into the canister 31 through the atmospheric air introduction passage 34. The fuel adsorbed in the canister 31 is consequently purged, together with the atmospheric air, into the surge tank 16 through the purge passage 33. Fuel in the purged gas is burned in the combustion chamber 11 together with the fuel injected from the injector 12.

The main part of the ECU 60 includes a microcomputer that has a central processing unit (CPU), a read only memory (ROM), a random access memory (RAM) and an input-output port. The ECU 60 includes a memory 60a. The memory 60a is defined, for example, in a predetermined area in the RAM. The ECU 60 is connected to the fuel injector 12, the spark plug 13, the purge control valve 35, the intake air temperature sensor 50, the coolant temperature sensor 51, the engine speed sensor 52, a main switch, which is an ignition switch 53 in this embodiment, and a starter 54. The ECU 60 controls the fuel injector 12, the spark plug 13, the purge control valve 35, the block valve 36 and the starter 54 based on detected signals form the sensors 50, 51, 52 and control signals from the ignition switch 53.

Automatic intermittent operation of the engine 10, or automatic suspension and restarting of the engine 10, is performed in the following manner.

If the ECU 60 judges that a predetermined suspension condition is satisfied when the engine 10 is running, the ECU 60 stops the engine 10 by controlling the fuel injector 12 to stop injecting fuel and controlling the spark plug 13 to stop igniting air-fuel mixture. Thereafter, when judging that a predetermined restart condition is satisfied, the ECU 60 actuates the starter 54 to start the engine 10 by cranking.

Automatic intermittent operation is performed when the ignition switch 53 is at the on position, or when electricity is being supplied to the engine system. When the ignition switch 53 is at the on position, the sensors 50–52 are activated to execute detection, and the operational devices 12, 13, 17, 35, 36 and 54 can be activated in response to commands from the ECU 60. In other words, the state in which electricity is being supplied to the engine system refers to a state in which the ECU 60 can control the engine 10 based on various conditions and is not limited to a state where the engine 10 is actually running.

A malfunction of the fuel vapor treating mechanism 30 is detected in the following manner.

The ECU 60 closes the block valve 36 and opens the purge control valve 35 so that the vapor path, which includes the purge passage 33, the canister 31, the vapor passage 32 and the fuel vapor treating mechanism 30, is exposed to the intake pressure. Accordingly, the pressure in the vapor path falls below the atmospheric pressure. Then, the ECU 60 closes the purge control valve 35 to seal the vapor path. Thereafter, the ECU 60 monitors the pressure in the vapor path by a pressure sensor (not shown) to detect pressure increase.

If the rate of pressure increase is greater than a predetermined level, the ECU 60 judges that there is a malfunction, or there is a puncture, in the vapor path. If the pressure increase rate is less than the predetermined level, the ECU 60 judges that there is no malfunction.

If the fuel temperature is relatively high, the ECU 60 may falsely detect a malfunction.

Accordingly, the ECU 60 judges whether the engine 10 was started at a relatively low temperature. If the engine 10 was started at a relatively low temperature, the ECU 60 performs the above malfunction test. The procedure for judging whether the engine 10 is started at a relatively low temperature will now be described with reference to the flowchart of FIGS. 2 and 3. The ECU 60 executes the procedure of FIGS. 2 and 3 at predetermined intervals.

In step S100, the ECU 60 judges whether the ignition switch 53 is at on position. If the ignition switch 53 is at off position, the ECU 60 then proceeds to step S104. In step S104, the ECU 60 sets a start flag X to OFF and proceeds to step S105. In step S105, current supply to the engine system is stopped and the current routine is temporarily suspended. Even if the ignition switch 53 is at the off position, the ECU 60 receives electricity so that the ECU 60 can execute step S100.

If the ignition switch 53 is at the on position in step S100, that is, if electricity is being supplied to the engine system, whether the engine speed NE is less than a predetermined level N1, which is for example 200 rpm, is judged in step S102. If the engine speed NE is equal to or greater than the level N1, that is, if the outcome of step S102 is negative, the ECU 60 judges that the engine 10 is running and proceeds to step S108. In step S108, the ECU 60 sets a start flag X to on and, then, proceeds to step S106. That is, the engine 10 is determined to be running when the ignition switch 53 is on and the engine speed NE is equal to or greater than the predetermined level N1.

The ECU 60 judges that the engine 10 is started when the engine speed NE reaches the predetermined level N1 for the first time after the ignition switch 53 is switched to the on position. In other words, the ECU 60 judges that the engine 10 is started by turning the ignition switch 53 on when the start flag X is switched from off to on.

If the engine speed NE is less than the predetermined level N1, that is, if the outcome of step S102 is positive, the ECU 60 proceeds to step S106 without executing step S108. When the ignition switch 53 is on and the engine system is beings supplied with electricity, the start flag X is not set to off even if the engine speed NE falls below the predetermined level N1. Also, if the start flag X is on, the state of the flag X is maintained.

In step S106, the ECU 60 judges whether the start flag X is on.

If the flag X is on, that is, if the outcome of step S106 is positive, the ECU 60 proceeds to step S110. In step S110, the ECU 60 adds a predetermined value ΔT to a time period T, which indicates period that has elapsed since the engine 10 was started. If the flag X is off, that is, if the outcome of step S106 is negative, the ECU 60 moves to step S112 and resets the time period T to zero. The time period T represents the period from when the start flag X is switched from off to on, or the period from when the engine 10 is started by turning the ignition switch 53 on.

After executing either steps S110 and S112, the ECU 60 proceeds to step S114. In step S114, the ECU 60 judges whether the time period T is in a predetermined range. Specifically, the ECU 60 judges whether the time period T satisfies the following inequality 0<time period T<a referential time period t1.

The referential time period t1 is, for example, five seconds.

If the time period T is in the predetermined range, that is, if the outcome of step S114 is positive, the ECU 60 proceeds to step S116. In step S116, the ECU 60 stores information representing the current temperature of the engine 10 into the memory 60a as referential values. In this embodiment, the coolant temperature Tw, which is detected by the coolant temperature sensor 51, and the intake air temperature Ta, which is detected by the intake air temperature sensor 50, are stored as referential temperatures Tw0 and Ta0. If the time period T is not in the predetermined range, the referential temperatures Tw0 and Ta0 are not renewed. That is, if the time period T is longer than the referential time period t1, information regarding the engine temperature, or the referential temperatures Tw0 and Ta0 that were stored when the time period T was in the predetermined range are maintained.

In step S118, the ECU 60 judges whether the start flag X is on. If the flag X is on, that is, if the outcome of step S118 is positive, the ECU 60 proceeds to step S120. In step S120, the ECU 60 judges whether the referential coolant temperature Tw0 is less than a predetermined determination level Tw1 (for example, ten degrees centigrade) and the referential intake air temperature Ta0 is less than a predetermined determination level Ta1 (for example, ten degrees centigrade).

If the outcome of step S120 is positive, the ECU 60 judges that the engine 10 was started at a relatively low temperature and the fuel temperature is also low. In this case, the ECU 60 proceeds to step S122. In step S122, the ECU 60 performs the malfunction test of the fuel vapor treating mechanism 30. If the outcome of step S120 is negative or if the outcome of step S118 is negative, the ECU 60 judges that the temperature of the engine 10 was started at a relatively high temperature. In this case, the ECU 60 does not perform the malfunction test. In this manner, the malfunction test of the fuel vapor treating mechanism 30 is performed only when the temperature of the engine 10 is relatively low, which improves the accuracy of the test.

After step S122 is executed or if the outcome of either steps S118 and S120 is negative, the routine is suspended.

Referring to the time chart of FIG. 4, changes of the start flag X, the time period T, the referential coolant temperature Tw0 and the referential intake air temperature Ta0 when the ignition switch 53 is turned on will be described.

Figure 4:
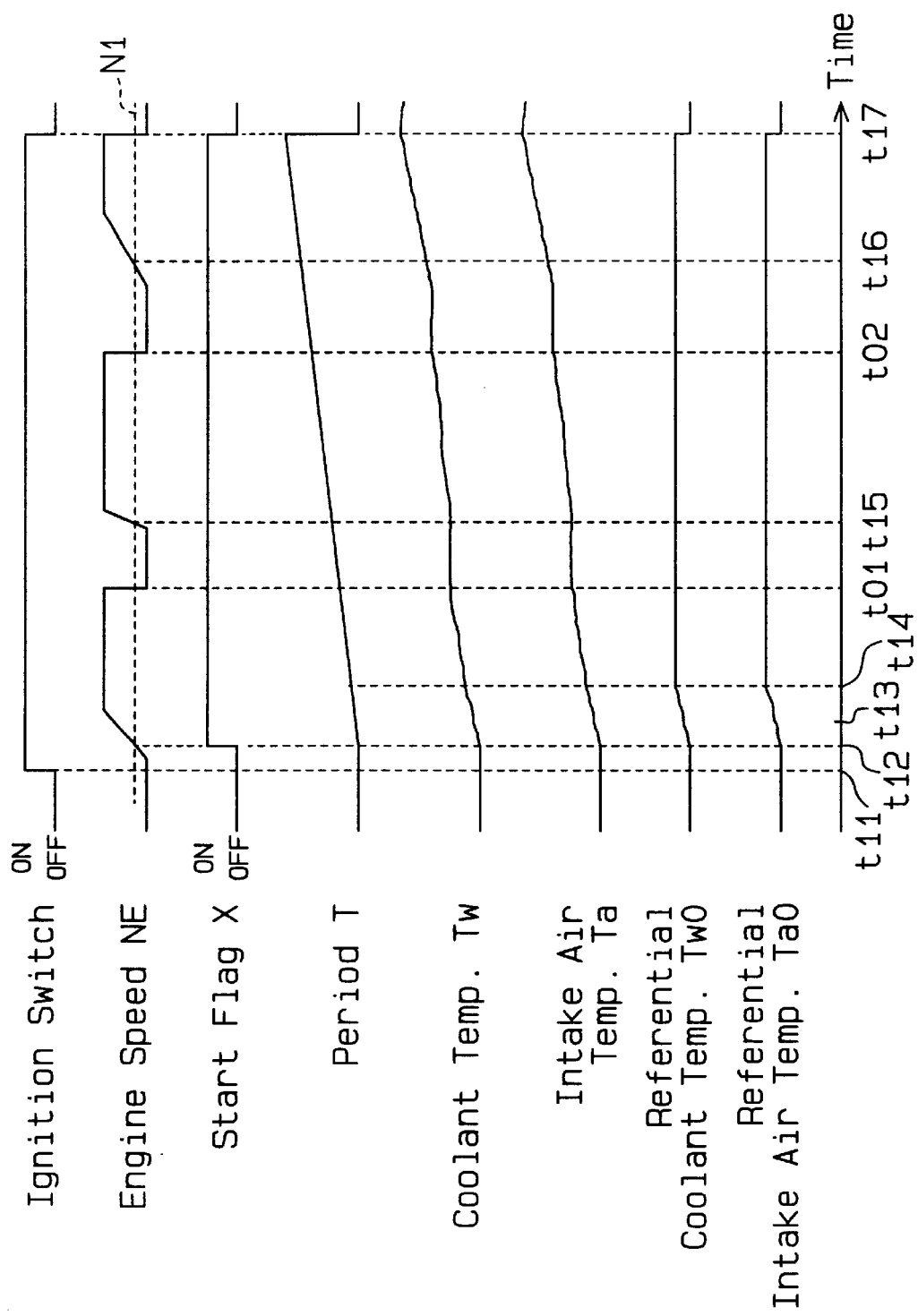
FIG. 4 is a graph showing the operation of the engine system of FIG. 1.

In the time chart of FIG. 4, the ignition switch 53 is switched from the off position to the on position at time t11, which causes the starter 54 to crank the engine 10. At time t12, the engine speed NE reaches 200 rpm, which sets the start flag X to on. Also, the time period T starts being counted. When the time period T is within a predetermine range (from time t12 to time t14), or when the time period T is less than the referential time period t1, the coolant temperature Tw and the intake air temperature Ta at time t13 are stored as the referential coolant temperature Tw0 and the referential intake air temperature Ta0. Time t13 is between time t12 and time t14.

If the ignition switch 53 is maintained at the on position thereafter, the start flag X is maintained to on even if the engine 10 is stopped at times t01 and t02 due to automatic intermittent operation and the engine speed NE falls below the predetermined level N1. Thus, even if the engine 10 is stopped due to automatic intermittent operation, the malfunction test of the fuel vapor treating mechanism 30 is continued without suspension. Further, when the engine 10 is started again at times t15 and t16 due to automatic intermittent operation, the malfunction test of the fuel vapor treating mechanism 30 is not started over but is continued.

The referential coolant temperature Tw0 and the referential intake air temperature Ta0 are maintained at the values at time t14. That is, the referential temperatures Tw0 and Ta0 are not renewed at times t15 and t16, or when the engine 10 is restarted in automatic intermittent operation. Therefore, the malfunction test for the fuel vapor treating mechanism 30 is not stopped due to renewal of the referential temperatures Tw0 and Ta0 during automatic intermittent operation. When the ignition switch 53 is turned off at time t17, the start flag X is set to off, which resets the time period T to zero.

The illustrated embodiment has the following advantages.

(1) After set to on, the start flag X is maintained on regardless whether the engine 10 is stopped until the ignition switch 53 is turned off. In other words, after the engine 10 is first judged to be running after the engine system starts receiving electricity, the engine 10 is judged to be running until supply of electricity to the engine system is stopped. Once the engine 10 is judged to have started, the engine 10 is assumed to be running regardless whether the engine is stopped due to automatic intermittent operation until supply of electricity to the engine system is stopped. Therefore, if the engine 10 is stopped and restarted in automatic intermittent operation, the malfunction test is not started from the beginning but is continued.

(2) Whether the engine 10 is running is judged based on whether the engine speed NE has reached a predetermined level. The judgment is therefore easy and accurate.

(3) When the engine 10 is stopped, whether the start flag X need be set to off is determined based on whether the ignition switch 53 is turned off. Therefore, whether the engine 10 is stopped due to automatic intermittent operation or to the will of the driver is reliably distinguished.

(4) After the engine 10 is first judged to be running, that is, after the engine 10 is started by turning the ignition switch 53 on, the referential temperatures Tw0, Ta0 are renewed only in the predetermined period T (0<T<t1). Therefore, if the engine 10 is judged to be sufficiently cold for the malfunction testing based on the referential temperatures Tw0, ta0 when the predetermined period T has elapsed, the engine temperature is judged to be sufficiently low as long as the ignition switch 53 is on even if the coolant temperature Tw and the intake air temperature Ta increase. If the engine 10 is stopped and started again due to automatic intermittent operation after the predetermined period T has elapsed, whether the malfunction test can be performed is not judged again based on the coolant temperature Tw and the intake air temperature Ta when the engine 10 is started again. Thus, if the engine 10 is stopped and started due to automatic intermittent operation, the malfunction testing is continued regardless of increases in the temperatures Tw, Ta.

It should be apparent to those skilled in the art that the present invention may be embodied in many other specific forms without departing from the spirit or scope of the invention. Particularly, it should be understood that the invention may be embodied in the following forms.

In the illustrated embodiment, the referential engine speed N1 is 200 rpm, the referential time period t1 is five seconds, the referential temperatures Tw, Ta are ten degrees centigrade. However, these values may be changed.

In the illustrated embodiment, whether the engine 10 has started at a low temperature is judged based on the coolant temperature Tw and the intake air temperature Ta. However, only one of the temperatures Tw and Ta may be used. Alternatively, other temperature information may be used for judging whether the engine 10 has been started at a low temperature as long as the engine temperature can be detected based on the information.

The illustrated embodiment judges whether the engine 10 is started at a low temperature. However, the present invention may be applied to an apparatus that judges whether an engine is started at a relatively high temperature.

In the illustrated embodiment, the engine system is judged to be deactivated when the ignition switch 53 is turned off. However, whether the engine system is deactivated may be judged based on whether power supply from a main power source to the engine system control computer is stopped.

The present invention may be applied to engine systems other than gasoline type engines systems. For example, the present invention may be applied to a diesel engine system.

Therefore, the present examples and embodiments are to be considered as illustrative and not restrictive and the invention is not to be limited to the details given herein, but may be modified within the scope and equivalence of the appended claims.

What is claimed is:

1. An apparatus for monitoring start of an engine, wherein the engine performs automatic intermittent operation with electricity being supplied to an engine system, the apparatus comprising a controller for judging that the engine is started with electricity being supplied to the engine system, wherein, after judging that the engine has started, the controller assumes that the engine is running even if the engine is stopped due to automatic intermittent operation until the supply of electricity to the engine system is stopped.

2. The apparatus according to claim 1, wherein the controller judges that the engine has started when the engine speed reaches a predetermined level.

3. The apparatus according to claim 1, wherein the engine system includes an ignition switch, wherein, when the ignition switch is on, electricity is supplied to the engine system, and when the ignition switch is turned off, the supply of electricity to the engine system is stopped, and wherein the controller judges whether electricity is being supplied to the engine system based on the state of the ignition switch.

4. The apparatus according to claim 1, further comprising a memory for storing the temperature of the engine, wherein the memory renews the temperature to be stored only during a predetermined period after the engine is judged to have started.

5. The apparatus according to claim 4, wherein the temperature includes at least one of the temperature of coolant circulating in the engine and the temperature of air drawn into the engine.

6. The apparatus according to claim 4, wherein, after judging that the engine has started, the controller judges whether to perform a predetermined specific control procedure based on the temperature stored in the memory.

7. The apparatus according to claim 6, wherein the specific control procedure includes a malfunction test for the engine system.

8. The apparatus according to claim 7, wherein the engine system includes a mechanism for treating fuel vapor, and wherein, after judging that the engine has started, the controller performs a malfunction test for the fuel vapor treating mechanism if the temperature stored in the memory is lower than a predetermined level.

9. The apparatus according to claim 1, wherein, when judging that the engine has started, the controller sets a start flag, which indicates that the engine has started, to on, and wherein the controller maintains the start flag on until the supply of electricity to the engine system is stopped.

10. An apparatus for monitoring start of an engine, wherein the engine performs automatic intermittent operation with electricity being supplied to an engine system, the apparatus comprising a controller for judging that the engine is running with electricity being supplied to the engine system, wherein, after first judging that the engine is running, the controller assumes that the engine is running even if the engine is stopped due to automatic intermittent operation until the supply of electricity to the engine system is stopped.

11. The apparatus according to claim 10, wherein the controller judges that the engine is running when the engine speed reaches a predetermined level.

12. The apparatus according to claim 10, further comprising a memory for storing the temperature of the engine, wherein the memory renews the temperature to be stored only during a predetermined period after the engine is first judged to be running.

13. The apparatus according to claim 12, wherein the temperature includes at least one of the temperature of coolant circulating in the engine and the temperature of air drawn into the engine.

14. The apparatus according to claim 12, wherein, when judging that the engine is running, the controller judges whether to perform a predetermined specific control procedure based on the temperature stored in the memory.

15. The apparatus according to claim 14, wherein the engine system includes a mechanism for treating fuel vapor, wherein the specific control procedure includes a malfunction test for the fuel vapor treating mechanism, and wherein, when judging that the engine is running, the controller performs the malfunction test for the fuel vapor treating mechanism if the temperature stored in the memory is lower than a predetermined level.

16. The apparatus according to claim 10, wherein, when judging that the engine is running, the controller sets a start flag, which indicates that the engine is running, to on, and wherein the controller maintains the start flag on until the supply of electricity to the engine system is stopped.

17. A method for monitoring start of an engine, wherein the engine performs automatic intermittent operation with electricity being supplied to an engine system, comprising:
    judging that the engine is started with electricity being supplied to the engine system; and
    assuming that the engine is running even if the engine is stopped due to automatic intermittent operation once the engine is judged to be started until the supply of electricity to the engine system is stopped.

* * * * *